United States Patent [19]

Hayashi

[11] Patent Number: 5,140,593
[45] Date of Patent: Aug. 18, 1992

[54] METHOD OF CHECKING TEST PROGRAM IN DUPLEX PROCESSING APPARATUS

[75] Inventor: Takao Hayashi, Tokyo, Japan

[73] Assignee: NEC Corporation, Tokyo, Japan

[21] Appl. No.: 434,772

[22] Filed: Nov. 13, 1989

[30] Foreign Application Priority Data

Nov. 14, 1988 [JP] Japan .................. 63-285791

[51] Int. Cl.⁵ .................. G06F 11/00
[52] U.S. Cl. .................. 371/9.1; 395/575; 364/DIG. 1; 364/268.1; 364/268.9
[58] Field of Search .................. 371/9.1, 8.1, 11.3; 364/268.1, 268.4, 268.9

[56] References Cited

U.S. PATENT DOCUMENTS

| | | | |
|---|---|---|---|
| 4,684,885 | 8/1987 | Chapman et al. | 371/9.1 |
| 4,736,339 | 4/1988 | Crabbe et al. | 364/900 |
| 4,751,702 | 6/1988 | Beier et al. | 371/9.1 |
| 4,755,995 | 7/1988 | Anderson et al. | 371/9.1 |
| 4,775,976 | 10/1988 | Yokoyama | 371/9.1 |
| 4,849,979 | 7/1989 | Maccianti et al. | 371/9.1 |
| 4,881,227 | 11/1989 | Buhren | 371/9.1 |
| 4,894,828 | 1/1990 | Novy et al. | 371/11.3 |
| 4,975,838 | 12/1990 | Mizuno et al. | 364/200 |

OTHER PUBLICATIONS

Fletcher et al., "AXE for Small Exchange Applications", Ericsson Review, No. 4, 1986, pp. 140–148.

Primary Examiner—Charles E. Atkinson
Attorney, Agent, or Firm—Laff, Whitesel, Conte & Saret

[57] ABSTRACT

Disclosed is a method of checking a test program in a duplex processing apparatus including two processors connected to each other through a failure acknowledge line and an interprocessor communication line and constituting an active system and a standby system, main memories connected to the two processors through buses, respectively, a queue connected to the buses which connect the processors to the main memories, and bus arbitors for controlling contention of a bus occupy right on the buses. In this method, normality of the test program is checked from an execution address of the test program executed by the standby processor under the control of the active processor.

4 Claims, 4 Drawing Sheets

METHOD OF CHECKING TEST PROGRAM IN DUPLEX PROCESSING APPARATUS

BACKGROUND OF THE INVENTION

The present invention relates to a method of checking a test program in a duplex processing apparatus and, more particularly, to a method of checking a test program executed by a standby system simultaneously with execution of a program by an active system.

In a conventional duplex processing apparatus, one of two processors serves as an active processor, and the remaining processor serves as a standby processor. The active processor reads out instructions and data from its main memory to perform on-line operations, while the standby processor executes a test program for checking its normality.

In a conventional duplex processing apparatus, an on-line program runs in the memory for the active processor, and the memories of the active and standby systems are simultaneously updated to duplex the memory contents. A test program for detecting a failure is executed by the standby processor simultaneously with execution of the on-line program by the active processor, thereby preventing the failure of the standby system.

During checking of the conventional duplex processing apparatus, when a failure is detected in the standby system, this is signaled to the active processor. In this apparatus, no problem is posed when the test program normally runs. However, for example, when the standby test program has a failure or overruns due to hardware fault or a software bug, an on-line memory area of the standby processor may be broken. Under this circumstance, since the test program itself overruns, and the standby processor cannot acknowledge the failure to the active processor. As a result, system reliability is adversely degraded.

SUMMARY OF THE INVENTION

It is, therefore, a principal object of the present invention to provide a method of checking a test program in a duplex processing apparatus which can improve system reliability.

In order to achieve the above object of the present invention, there is provided a method of checking a test program in a duplex processing apparatus comprising two processors connected to each other through a failure acknowledge line and an interprocessor communication line and constituting an active system and a standby system, main memories connected to the two processors through buses, respectively, a queue connected to the buses which connect the processors to the main memories, and bus arbitors for controlling contention of a bus occupy right on the buses, comprising checking normality of the test program from an execution address of the test program executed by the standby processor under the control of the active processor.

DESCRIPTION OF THE PREFERRED EMBODIMENT

A preferred embodiment of the present invention will be described in detail with reference to the accompanying drawings.

Figure 1:
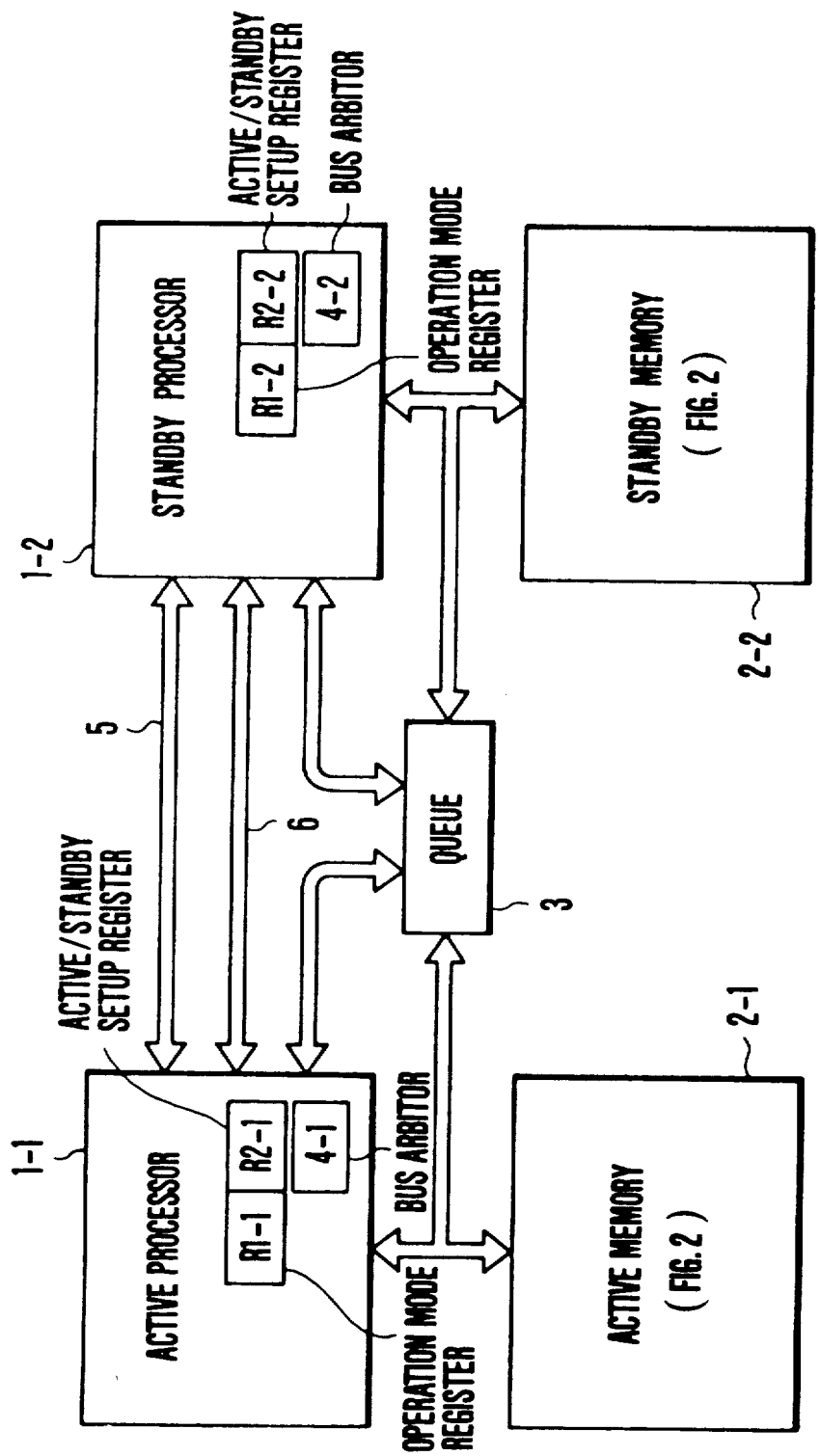
FIG. 1 is a block diagram of a duplex processing apparatus according to an embodiment of the present invention.

FIG. 1 shows an arrangement of a duplex processing apparatus according to an embodiment of the present invention.

Referring to FIG. 1, reference numerals 1-1 and 1-2 denote active and standby processors or 0- and 1-systems each incorporating a CPU; 2-1 and 2-2, active and standby memories, respectively. Reference numeral 3 denotes a queue for updating the memories. Reference numerals 4-1 and 4-2 denote active and standby bus arbitors contained in the active and standby processors 1-1 and 1-2, respectively.

Reference numeral 5 denotes a failure acknowledge line; 6, an interprocessor communication line for causing the processors 1-1 and 1-2 to directly exchange data therebetween.

Figure 2:
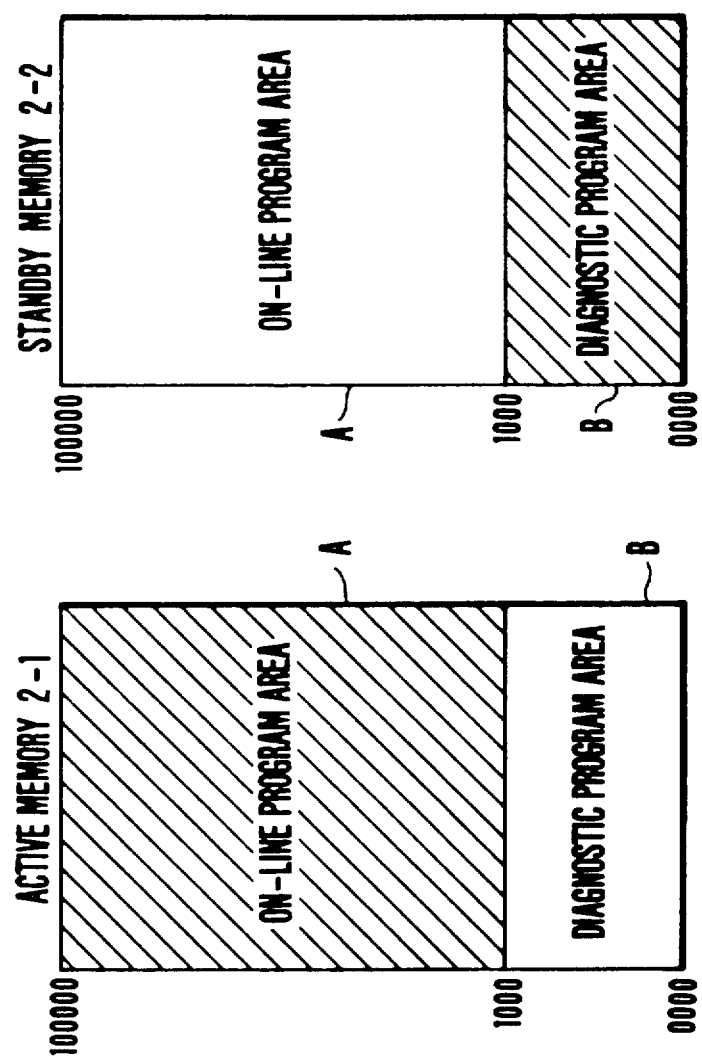
FIGS. 2A and 2B are data formats of active and standby memories shown in FIG. 1, respectively.

The contents of the active and standby memories 2-1 and 2-2 shown in FIG. 1 are shown in FIGS. 2A and 2B, respectively. Each memory has a diagnostic program area A and an on-line area B. In this embodiment, an area from address 0 to address 1000 serves as the diagnostic program area A, and a diagnostic program is stored therein. An area from address 1001 to address 100000 serves as the on-line area B, and an on-line program is stored therein. During synchronous operation, the memory 2-1 is updated by a memory write request generated upon execution of the active on-line program. For this reason, the data at the addresses identical with those of the memory 2-1 are also updated in the standby memory 2-2. However, the program is created not to update the data in the diagnostic program area A at addresses 0 to 1000 of the memory 2-2. That is, the on-line program should not access the diagnostic program area of the memory 2-2. The standby diagnostic program stored in the area B of the standby memory 2-2 at addresses 0 to 1000 is executed to check normality of standby hardware. When a failure is detected, a standby failure is acknowledged as an interrupt to the active processor 1-1 through the failure acknowledge line 5. Upon reception of the interrupt, the active system detects the failure of the standby system and disconnects the standby system by changing the operation mode from the synchronization mode to an asynchronization mode.

In the synchronization mode, when a memory write request is generated by the active system, a write address signal and a data signal are written in the queue 3 arranged between the mating processors 1-1 and 1-2. The standby memory 2-2 is updated by the standby bus arbitor 4-2 using an empty area of a standby memory bus in accordance with the content of the queue 3.

In the asynchronization mode, a memory write operation from the active system to the standby memory 2-2 is not performed. The synchronization/asynchronization mode is set by an operation mode register R1-1 (one bit) in the active processor 1-1. The active/standby mode is set by an active/standby setup register R2-1 in the active system. When logic "0" is set in the register R2-1, a 0-system processor is active, and a 1-system processor is standby. When the active/standby setup register R2-1 of the active system is set at logic "1", the 0-system processor is standby, and the 1-system processor is active. In this case, a register R2-2 stores an inverted content of the register R2-1.

Operation mode registers R1-1 and R1-2 and the active/standby setup registers R2-1 and R2-2 can be set in accordance with a program.

Figure 3:
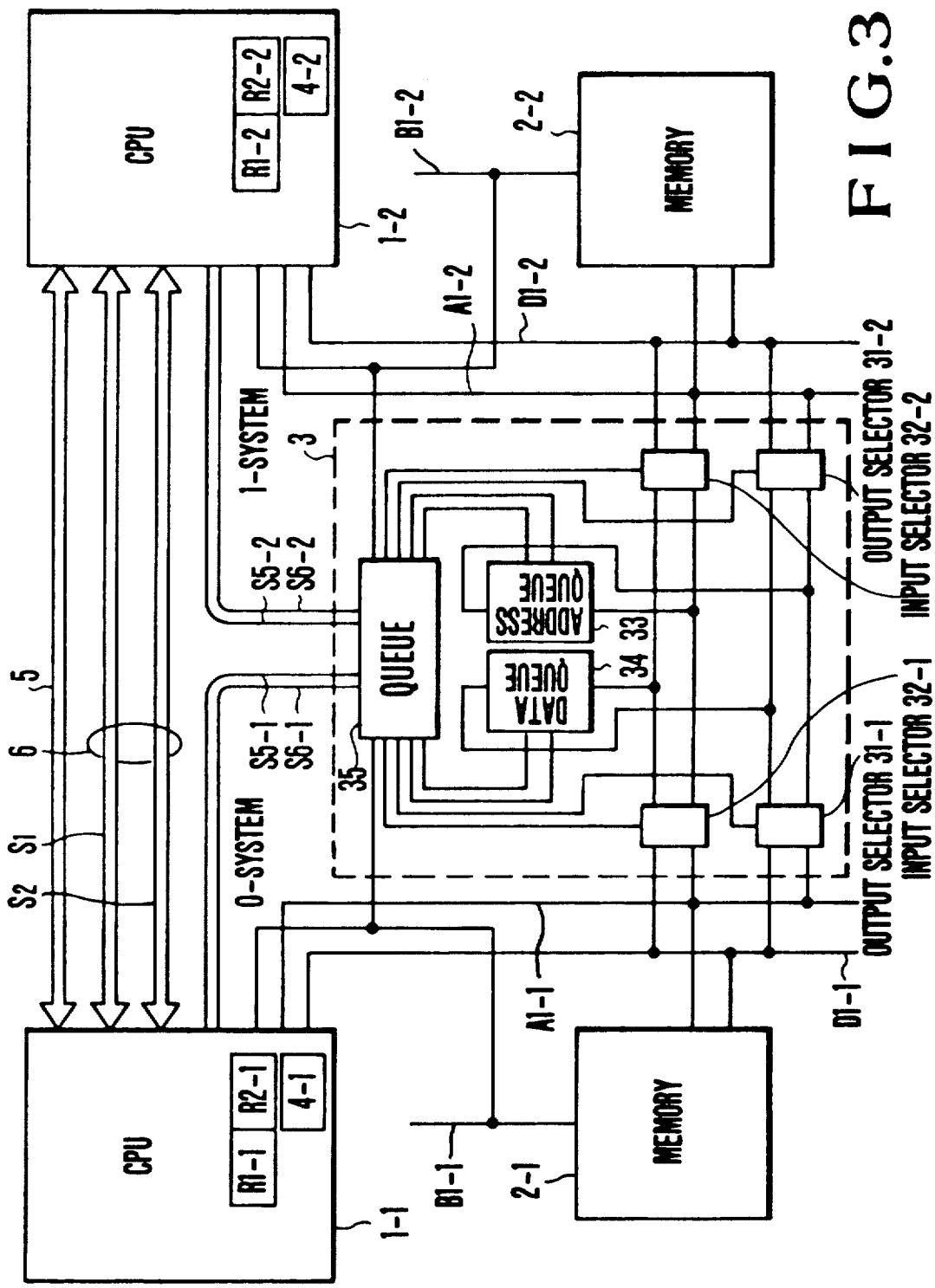
FIG. 3 is a detailed block diagram of the duplex processing apparatus shown in FIG. 1.

FIG. 3 shows a detailed arrangement of the duplex processing apparatus shown in FIG. 1 and, particularly, a detailed arrangement of the queue 3. Referring to FIG. 3, reference numerals 31-1 and 31-2 denote input selectors; 32-1 and 32-2, output selectors; 33, an address queue; 34, a data queue; and 35, a queue controller.

Reference symbol S1 denotes a stop request line for sending a request for stopping the opposite processor between the active and standby processors 1-1 and 1-2. Reference symbol S2 denotes a signal line for reading a stop address signal of the opposite processor between the active and standby processors 1-1 and 1-2. These signal lines S1 and S2 are represented as the interprocessor communication line in FIG. 1.

Reference symbols B1-1 and B1-2 denote control buses for connecting the active and standby processors 1-1 and 1-2 to the queue 3 and transmitting control data therebetween. Reference symbols D1-1 and D1-2 denote data buses for connecting the active and standby processors 1-1 and 1-2 to the queue 3 and transmitting data signals therebetween. Reference symbols A1-1 and A1-2 denote address buses for connecting the active and standby processors 1-1 and 1-2 to the queue 3 and transmitting address signals therebetween.

Reference symbols S5-1 and S5-2 denote bus enable signal lines for connecting the queue controller 35 in the queue 3 to the active and standby processors 1-1 and 1-2 and sending a bus enable signal for assigning a bus occupy right from the active or standby processor 1-1 or 1-2. Reference symbols S6-1 and S6-2 denote bus occupy signal lines for connecting the queue controller 35 to the active and standby processors 1-1 and 1-2 and sending a bus occupy signal to the active or standby processor 1-1 or 1-2.

The input selectors 31-1 and 31-2 of the queue 3 write address and data signals required for write access in the address queue 33 and the data queue 34 through the address bus A1 1 and the data bus D1-1 under the control of the queue controller 35 when, e.g., the 0-system is active. The address and data signals written in the address queue 33 and the data queue 34 are sent onto the standby address bus A1-2 and the standby data bus D1-2 through the output selector 32-1 under the control of the queue controller 35 and are written in the standby memory 2-2. In this case, the bus occupy signal is sent from the queue controller 35 to the CPU of the standby processor 1-2 so as to prevent a conflict with memory access of the diagnostic program executed by the standby system. A bus enable signal is sent from the CPU of the processor 1-2 onto the bus enable line S5-2. Upon reception of this bus enable signal, the address and data signals written in the address queue 33 and the data queue 34 are written in the standby memory 2-2. Note that the operation mode registers R1-1 and R1-2 and the active/standby setup registers R2-1 and R2-2 control the input selectors 31-1 and 31-2 and the output selectors 32-1 and 32-2 of the queue 3 through the queue controller 35.

In the above arrangement, the processor 1-1 is active, and the processor 1-2 is standby.

The active processor 1-1 reads out an instruction and data from the memory 2-1 and executes the on-line program. In the write mode, both the memories 2-1 and 2-2 are updated. In this case, the write address and data signals are simultaneously stored in the queue 3.

The queue 3 autonomously outputs the address and data signals. After the queue 3 obtains a communication right with the standby memory 2-2 by means of the bus arbitor 4-2, write access of the memory 2-2 is performed.

The standby processor 1-2 stores the failure detection program in an area which does not overlap the on-line area in the memory 2-2. The standby processor 1-2 performs the failure detection program simultaneously with and independently of the operation of the active processor 1-1. When a failure of the standby system is detected, the failure detection program sends an interrupt to the active processor 1-1 through the failure acknowledge line 5.

Figure 4:
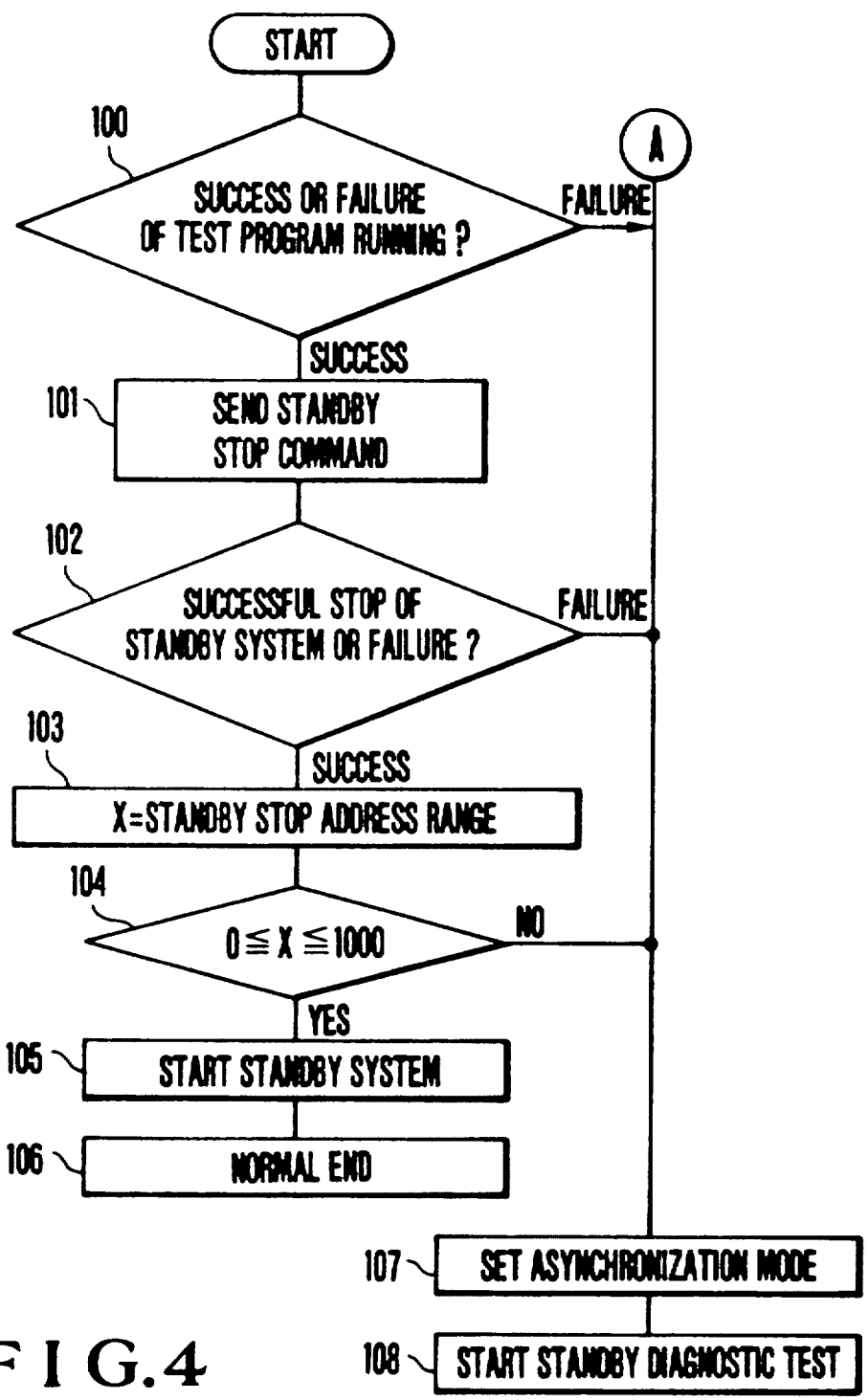
FIG. 4 is a flow chart for explaining a program for causing an active processor to monitor a running state of a standby failure detection program.

The following program sequence is performed to cause the active system to monitor a running state of the standby failure detection program. The flow chart of this program sequence is shown in FIG. 4.

The active processor 1-1 checks in step 100 whether the standby failure detection program is running. This check operation is initiated once every minute. If this check operation is successful, the flow advances to step 101 to stop the standby system. The active processor 1-1 sends a command to the standby processor 102 through the line 6. If the program stops in step 100, the flow advances to step 107 (to be described later) to set the asynchronization mode.

The active processor 1-1 checks in step 102 whether the standby system is successfully stopped. If the standby system is successfully stopped, the flow advances to step 103. A standby stop address X is sent to the active system. The active processor 1-1 checks in step 104 whether the stop address X falls within a predetermined range (e.g., 0 to 1000 in this embodiment) in accordance with memory assignment information of the failure detection program. If YES in step 104, the active processor 101 executes the on-line program, and the flow advances to step 105 to continue the failure detection program.

However, if the stop of the standby system fails in steps 100, 102, and 104, the flow advances to step 107 to set the operation mode register R1-1 in the asynchronization mode. The flow then advances to step 108 to start the program for diagnosing the standby system. Note that processing from connector Ⓐ is started if a failure other than the above failure is acknowledged from the standby system in FIG. 4.

According to the present invention, as has been described above, the standby failure detection function can be guaranteed, thereby providing a duplex processing apparatus having improved system reliability.

What is claimed is:

1. A method of checking a test program in a duplex processing apparatus comprising two processors connected to each other through a failure acknowledge line and an interprocessor communication line, said two processors constituting an active system and a standby system, main memories connected to said two processors through buses, respectively, a queue connected to said buses which connect said processors to said main memories, and bus arbitrators connected to said buses and provided in said each processor for controlling contention of a bus occupancy right on said buses, said method comprising stopping the test program executed by said standby processor when a command is sent from said active processor to said standby processor, and examining whether a stop address of the test program falls within a predetermined range or not, to check a normality of the test program under the control of said active processor.

2. A method according to claim 1, and the added steps wherein said active processor presets the predetermined range of the test program in said standby main memory, periodically examines the stop address of the test program, and determines an overrun of the test program when the stop address of the test program falls outside the predetermined range.

3. A method according to claim 2, wherein said active processor forcibly disconnects the standby system when said active processor determines that the test program executed by the standby system is overrunning.

4. A method according to claim 1, wherein checking normality comprises checking whether the test program executed by said standby processor runs.

* * * * *